US009354725B2

(12) United States Patent
Al-Sharif et al.

(10) Patent No.: US 9,354,725 B2
(45) Date of Patent: May 31, 2016

(54) TRACKING MOVEMENT OF A WRITING INSTRUMENT ON A GENERAL SURFACE

(71) Applicant: New York University, New York, NY (US)

(72) Inventors: Abdelrazak S. Al-Sharif, Abu Dhabi (AE); Ramesh Jagannathan, Abu Dhabi (AE); Mohamad Eid, Abu Dhabi (AE); Abdulmotaleb El Saddik, Ottawa (CA)

(73) Assignee: New York University, New York, NY (US)

( * ) Notice: Subject to any disclaimer, the term of this patent is extended or adjusted under 35 U.S.C. 154(b) by 194 days.

(21) Appl. No.: 13/907,338

(22) Filed: May 31, 2013

(65) Prior Publication Data

US 2013/0321356 A1 Dec. 5, 2013

Related U.S. Application Data

(60) Provisional application No. 61/654,629, filed on Jun. 1, 2012, provisional application No. 61/779,678, filed on Mar. 13, 2013.

(51) Int. Cl.
*G06F 3/0354* (2013.01)
*G06F 3/03* (2006.01)
*G06F 3/038* (2013.01)

(52) U.S. Cl.
CPC ............ *G06F 3/03545* (2013.01); *G06F 3/038* (2013.01); *G06F 3/0317* (2013.01); *G06F 3/0386* (2013.01); *G06F 3/03542* (2013.01)

(58) Field of Classification Search
CPC .............. G06F 3/03545; G06F 3/0317; G06F 3/03542; G06F 3/0386
USPC .......................................... 178/19.01; 645/179
See application file for complete search history.

(56) References Cited

U.S. PATENT DOCUMENTS

| 5,550,931 | A | * | 8/1996 | Bellegarda et al. | 382/187 |
|---|---|---|---|---|---|
| 5,799,107 | A | * | 8/1998 | Fukuchi | 382/181 |
| 6,115,482 | A | * | 9/2000 | Sears | G09B 21/006 348/62 |
| 6,594,616 | B2 | | 7/2003 | Zhang et al. | |
| 6,952,497 | B1 | * | 10/2005 | Hollstrom et al. | 382/188 |
| 7,013,046 | B2 | * | 3/2006 | Kawamura et al. | 382/186 |

(Continued)

FOREIGN PATENT DOCUMENTS

WO WO 2010061584 A2 * 6/2010

OTHER PUBLICATIONS

Philips Laser Sensors—Technology White Paper document, Sep. 2005, 4 pages.

(Continued)

*Primary Examiner* — Christopher E Leiby
(74) *Attorney, Agent, or Firm* — Foley & Lardner LLP

(57) ABSTRACT

Methods, systems, and apparatuses, including computer programs encoded on computer-readable media, for capturing, using a camera, an image of a general writing surface. The captured image is compared with one or more previously saved images. A related image is determined based upon syntax and semantics of handwriting recognized in the captured image and the one or more previously saved images. A previous document associated with the related image is retrieved and set as the active document. A position of a writing instrument is mapped to a position within the previous document.

20 Claims, 10 Drawing Sheets

(56) References Cited

U.S. PATENT DOCUMENTS

| | | | |
|---|---|---|---|
| 7,136,054 B2 | 11/2006 | Wang et al. | |
| 7,278,017 B2* | 10/2007 | Skantze | 713/168 |
| 7,474,809 B2 | 1/2009 | Carl et al. | |
| 8,027,055 B2* | 9/2011 | Silverbrook et al. | 358/1.18 |
| 8,228,299 B1* | 7/2012 | Maloney | G06Q 20/14 |
| | | | 345/173 |
| 8,261,967 B1* | 9/2012 | Long et al. | 235/375 |
| 2002/0149573 A1* | 10/2002 | Picoult et al. | 345/179 |
| 2002/0163511 A1* | 11/2002 | Sekendur | 345/179 |
| 2003/0106985 A1* | 6/2003 | Fagin et al. | 250/208.1 |
| 2005/0149258 A1 | 7/2005 | Gargi | |
| 2005/0168451 A1* | 8/2005 | Dodge | G06F 17/242 |
| | | | 345/179 |
| 2006/0279559 A1* | 12/2006 | Kongqiao et al. | 345/179 |
| 2007/0013680 A1 | 1/2007 | Yeung et al. | |
| 2007/0136264 A1* | 6/2007 | Tran | G06F 17/30867 |
| 2010/0021022 A1* | 1/2010 | Pittel et al. | 382/123 |
| 2010/0171891 A1* | 7/2010 | Kaji et al. | 349/12 |
| 2010/0289776 A1 | 11/2010 | Bryborn Krus et al. | |
| 2011/0242059 A1* | 10/2011 | Pasquero et al. | 345/177 |
| 2011/0304534 A1* | 12/2011 | Zhang | 345/156 |
| 2012/0020566 A1* | 1/2012 | Yamanouchi | 382/187 |
| 2012/0263381 A1* | 10/2012 | Yoshida | 382/189 |
| 2014/0028635 A1* | 1/2014 | Krah | 345/179 |

OTHER PUBLICATIONS

Philips Wireless Laser Mouse specification sheet, Sep. 2005, 2 pages.

* cited by examiner

100

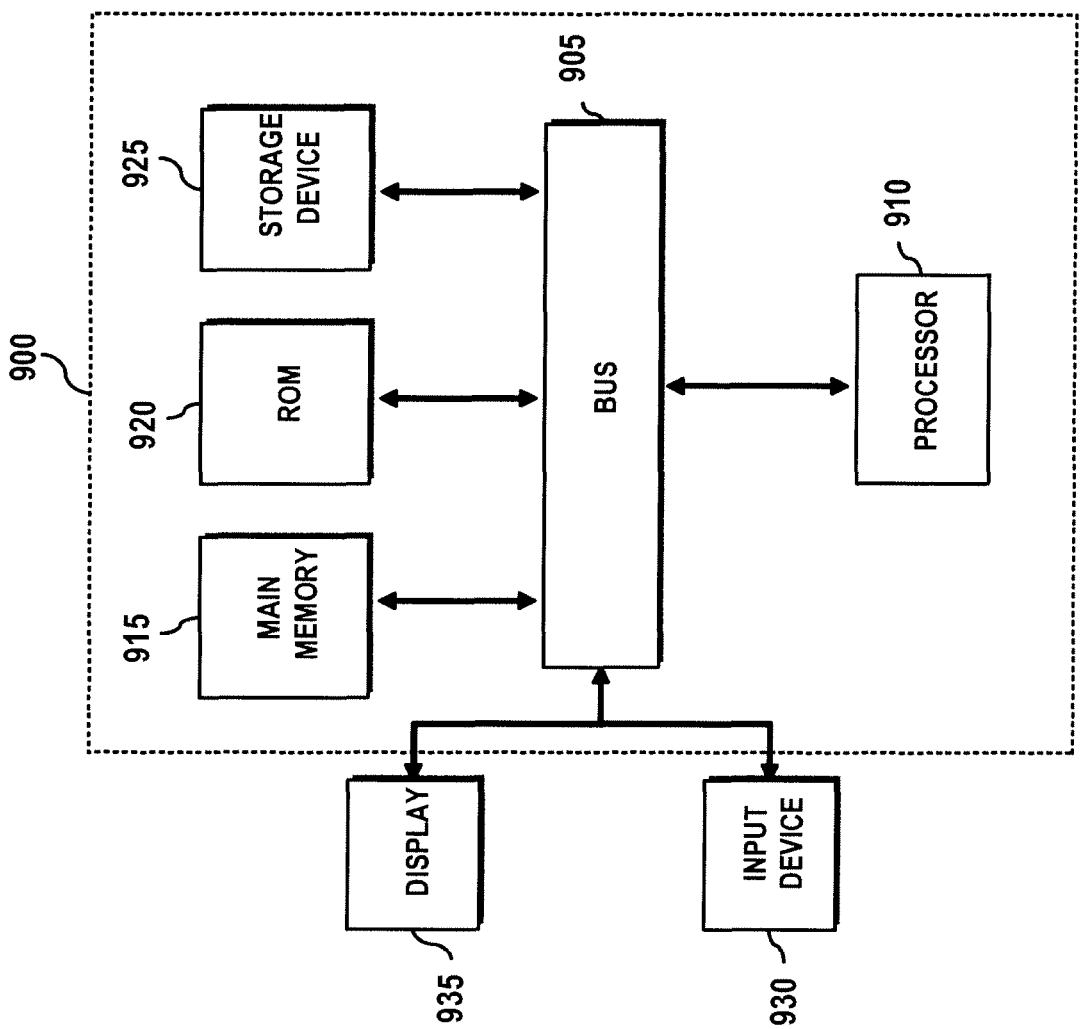

TRACKING MOVEMENT OF A WRITING INSTRUMENT ON A GENERAL SURFACE

CROSS REFERENCE TO RELATED APPLICATION

This application claims priority to U.S. Provisional Patent Application No. 61/654,629, filed Jun. 1, 2012, and U.S. Provisional Patent Application No. 61/779,678, filed Mar. 13, 2013. The contents of both applications are herein incorporated by reference in their entirety.

BACKGROUND

Today, the consumers have access to many types of digital devices, for example: smart phones, tablet computers, laptop computers, etc. The common methods of interacting with these digital systems are through various means, such as a keyboard, a touch screen, audio and video, etc. The digital devices can be used for generating various documents some of which can include shorthand notations, such as short message service (SMS).

The usual input technique into the digital systems is via manually typing keys on a keyboard or on a touch screen corresponding to letters, characters, numbers, symbols, etc. An alternative way of input is to use a stylus to actually write on a touch screen. Another new and popular method of communication with the digital systems is using voice recognition software. More recently, camera and sensor systems built on the digital devices are able to track movements of the user in real time as user input signals to the systems.

Even though all the above-mentioned techniques for user input for digital devices are relatively straight forward and user friendly, they all require constant physical interaction between the user and the device. These systems also are not adapted to utilize the user's natural way of life to acquire, store, retrieve, edit and transmit information in a non-invasive way. Rather, these techniques require the user to interact directly with the smart phone. In short, there is a pressing need for an input method that would work in the background in concert with and without modifying the user's natural habits, especially taking into count the small screen size on smart phones and the inconvenience of actually writing on the screen.

For example, it is more common and natural for a user to record information on a piece of paper using a pen or a pencil. Usually the user re-inputs such information into a digital system at a later time so that it doesn't get lost or for subsequent communication with other systems or users. This method of input to the digital system is not in real time, is time consuming, and it is likely the information will be lost. There is a need for a new input method, which in real time will capture information, created by the user in any form, and would allow storage, transmission and editing for future purposes.

In order to address this need, there are already products/concepts available in the market place. Livescribe Pulse™ is a smart pen that records the data written on a special paper using a camera and then saves the information on the internal memory of the pen. The information is retrieved by connecting the pen to a laptop, which means that the transmission of information is not done in real time. There are two other pens in the market, namely Zpen Digital Pen™ and the Yifang Smart Pen™. Both these pens need an external receiver to collect the written data, which is subsequently downloaded to a laptop. Moreover, in the case of Yifang smart pen the user can write only on the computer display screen. There is also a smart pen concept developed at Apple Corporation, which uses an accelerometer to detect and collect written information. The Apple concept pen is capable of writing on any substrate. One of the major disadvantages of the Apple concept pen is that the use of accelerometer prevents its miniaturization, eventually leading to higher cost.

All the above mentioned techniques are used to input data into digital systems (mainly laptops). But none of the products currently available in the market is designed to work in the background in concert with smart phones. In other words, it is not convenient to write with a pen (stylus) on a touch screen smart phone.

SUMMARY

In general, one aspect of the subject matter described in this specification can be embodied in methods for capturing, using a camera, an image of a general writing surface. The captured image is compared with one or more previously saved images. A related image is determined based upon syntax and semantics of handwriting recognized in the captured image and the one or more previously saved images. A previous document associated with the related image is retrieved and set as the active document. A position of a writing instrument is mapped to a position within the previous document. Other implementations of this aspect include corresponding systems, apparatuses, and computer-readable media configured to perform the actions of the method.

The foregoing summary is illustrative only and is not intended to be in any way limiting. In addition to the illustrative aspects, implementations, and features described above, further aspects, implementations, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

FIG. 9 is a block diagram of a computer system in accordance with an illustrative implementation.

Figure 1A:
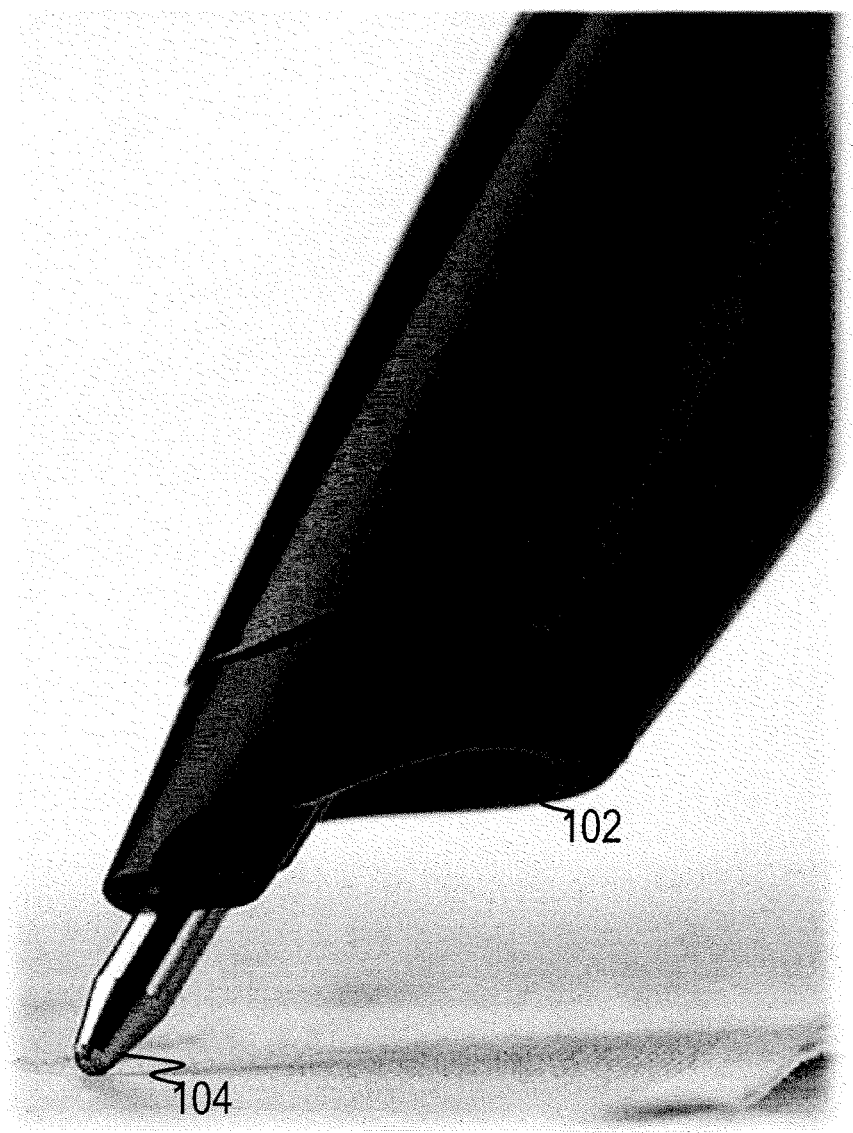
FIG. 1A illustrates a portion of an optoelectronic digital writing instrument in accordance with an illustrative implementation.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

This specification describes a pen-type device that captures a user's writing on a surface in a natural unobtrusive way. The pen-type device can work in concert with any portable digital device, such as, but not limited to, smart phones, personal digital assistants (PDAs), tablet computers, etc. As a user uses the pen-type device to write on any writing surface, data corresponding with the movement of the pen-type device can be communicated in real-time and in a non-invasive, user friendly way to the portable digital device. The portable digital device can then store the data and/or use handwriting recognition software to determine the words that were written by the user.

In one implementation, the pen-type device is a digital writing instrument with a regular ink tip that can also write on any surface, just like any regular pen would do. The pen has a common ink cartage that can be replaced once the ink runs out, and a built-in rechargeable lithium battery. In another implementation, the pen-type device has the look and feel of a normal pen, but without the ink tip. The physical appearance, dimensions and mass of the digital pen would be comparable to a regular pen.

As the screens of typical portable digital devices are much smaller compared to typical writing surfaces, a calibration option can scale the size of the screen to correspond to the area of a writing surface. In one implementation, the size of the writing area can be scaled to the fit entirely on the display. For example, the area of the writing surface can first be computed by an algorithm and converted to fit the screen for a given font type and size. Given that the shape of a smart phone display screen is normally a rectangle, the length of a line on the display screen is fixed once the font type and size is chosen. In another implementation, a portion of the writing area is shown on the display. Using this option, the screen can scroll appropriately based upon the location of the pen within the writing area. For example, the user could write at the top of the writing surface and the captured writing would appear near the top of a page displayed on the screen. The user could also write near the bottom of the writing surface, and the captured writing would be shown near the bottom of the page of the display. Further, the screen can scroll automatically as the user moves to different areas of the writing area.

FIG. 1A illustrate a portion an optoelectronic digital writing instrument in accordance with illustrative implementations. A pen-type device can be an optoelectronic digital writing instrument 100 that utilizes light from a light source to track movements of the writing instrument 100. In one implementation, the writing instrument 100 can include an ink tip 104. For example, the ink tip 104 can be a standard ballpoint mechanism. To track the movement of the writing instrument 100, an optical sensing system can be included in an optical-tracking compartment 102 near the end of the writing instrument 100. The sensitive optoelectronic-tracking system contained within the optical-tracking compartment 102 can capture and record the precise movement of the writing instrument in real time. The recorded information can be simultaneously transmitted to an external portable digital system.

Figure 1B:
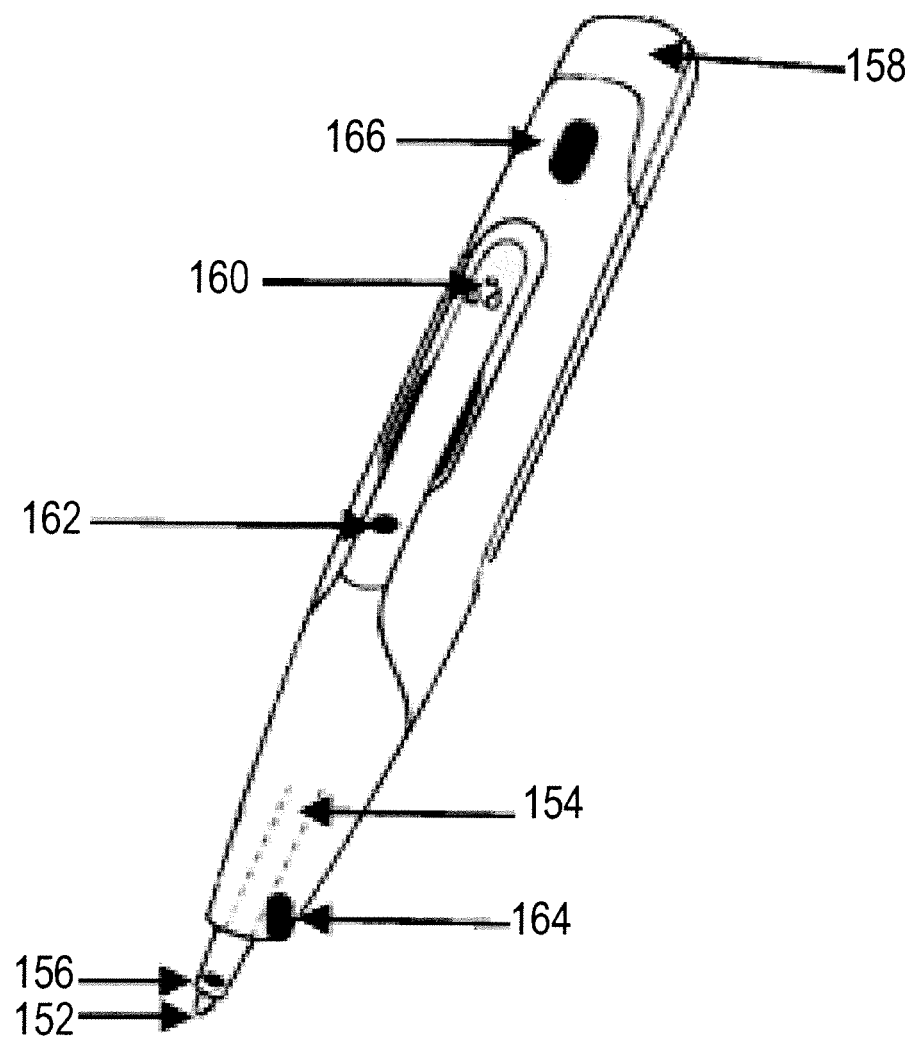
FIG. 1B illustrates of an optoelectronic digital writing instrument in accordance with an illustrative implementation.

FIG. 1B illustrates an optoelectronic digital writing instrument in accordance with an illustrative implementation. The optoelectronic digital writing instrument can be a pen 150 that includes a writing tip 152 and an ink cartridge 154. The use of the writing tip 152 and the ink cartridge 154 allow the pen 150 to write as a normal ink pen. As with a normal ink pen, the pen 150 can have a button the enables and disables the writing tip 152. In another implementation, the optoelectronic digital writing instrument can be a stylus without the writing tip 152 and ink cartridge 154. The movement tracking features of the optoelectronic digital writing instrument are what separates the pen 150 from a normal ink pen. In various implementations, a twin-eye laser sensor 156 can be used for tracking the movement of the writing tip 152. The twin-eye laser sensor can include two solid-state lasers whose beams are focused by a lens onto a surface. As the light scatters from the surface a sensor can detect some of the scattered light. In various implementations, the lasers, the lens, and the sensor can are all incorporated into the twin-eye laser sensor 156. In other implementations, these components can be incorporated into the optoelectronic digital writing instrument as two or more components. In various limitations, the tracking done by the twin-eye laser sensor 156 can track movement of the writing tip 152 when the writing tip is in contact with or close to a general surface. In one implementation, tracking data is only collected when the pen is close to the general surface. For example, an infra-red laser can transmit a beam to the general surface to detect the pen's distance from the general surface. If the distance is greater than a predetermined threshold, tracking data is not collected or collected but ignored by the handwriting recognition algorithm. If the distance of the pen to the general surface is below the predetermined threshold, the tracking data is collected and used to determine what the user is writing.

The pen 150 also includes one or more buttons to turn the tracking feature on and off. For example, the pen 150 has a power button 160 near its middle. In addition, the pen 150 can have an automatic shut off feature that can help save battery life of the pen. A calibration button 162 can be pressed by a user to calibrate the pen 150. An infra-red camera 164 can be used for calibrating the pen 150 to use previous handwriting. For example, a user can calibrate the pen 152, which is described in greater detail below, to use a piece of paper that already has handwriting on it. During the calibration, the previously written text can be analyzed and new writing can be appended to the text accordingly. The pen 150 also includes a digital signal processing (DSP) chip 164. The DSP chip 164 can handle wireless communication to/from the pen 150 and sophisticated signal processing of captured data in order to precisely determine the writing tip 152 position and velocity. Data, such as the writing tip 152 position and velocity, can be communicated wirelessly to a remote device, such as, but not limited to, a smart phone or a remote computing device. The pen 150 can also include a memory expansion slot 158 where a memory stick can be attached to store the captured data locally. This allows the pen 150 to be used in an offline mode, where data does not need to be wirelessly transmitted, rather, the data can be transferred to a remote computing device using the memory stick.

Figure 2:
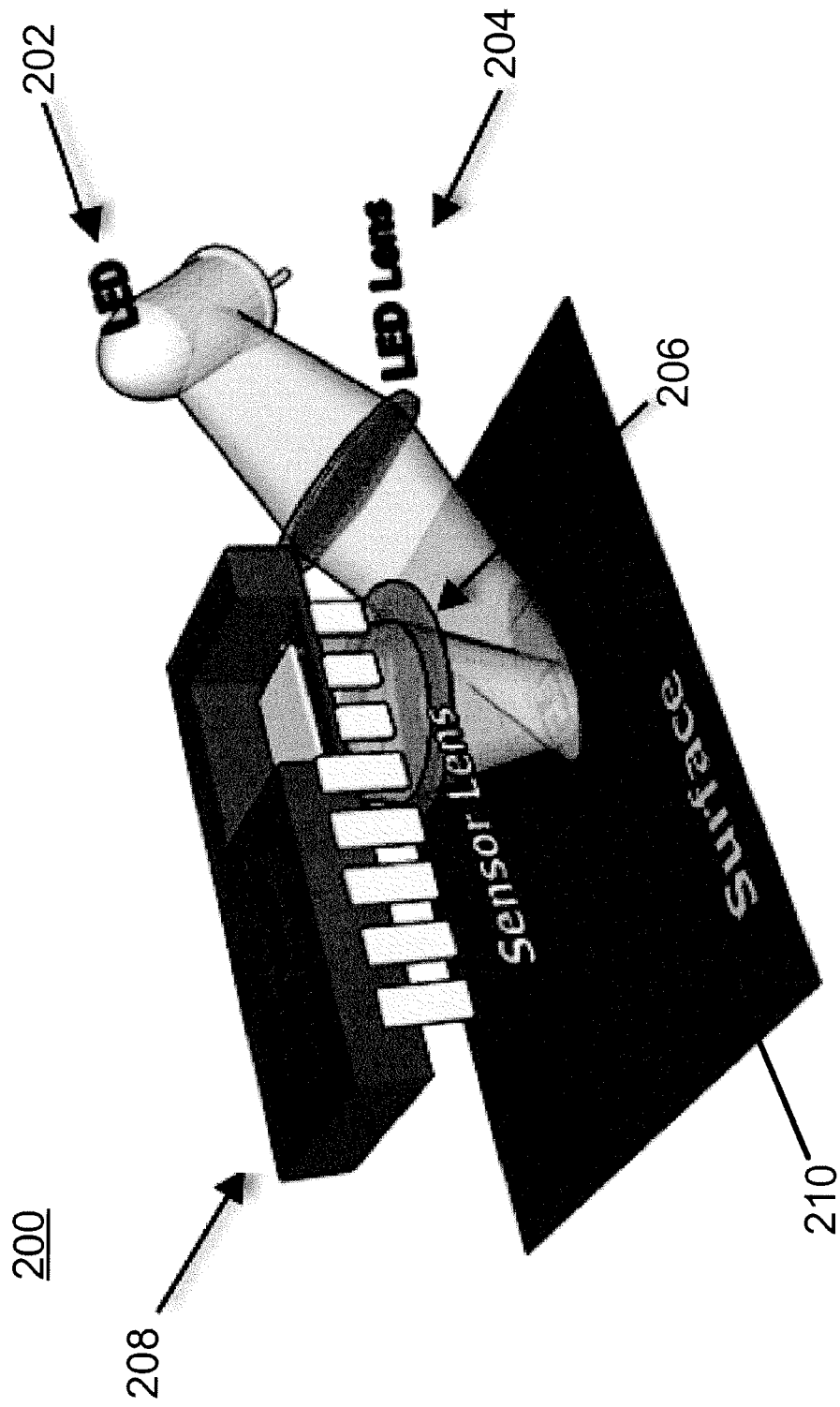
FIG. 2 illustrates a sensing system of an optoelectronic digital writing instrument in accordance with an illustrative implementation.

FIG. 2 illustrates a sensing system 200 of an optoelectronic digital writing instrument in accordance with an illustrative implementation. The sensing system 200 can include a light source, such as a light emitting diode (LED) 202, whose light is focused through a light source lens 204. The LED can be mounted on the writing instrument, adjacent to the tip of the writing instrument. When the writing instrument is held upright, for example, when used for writing, the light is directed to a surface 210. Portions of the light reflect from the surface 210 through a sensor lens 206 to a highly sensitive light tracking sensor 208. The light tracking sensor 208 detects the reflected light emitted by the LED 202 to continuously detect and record in real-time the movement of the tip of the writing instrument over any surface 210. Based upon the reflected light, the sensor 208 can generate movement data of the writing instrument. For example, the sensor 208 can provide relative movement data as the writing instrument moves across the surface 210. This movement data can be stored within the writing instrument or sent to an external device.

In one implementation, the optical tracking system is turned on based upon a pressure sensor that detects when the writing instrument is being used. For example, a pressure sensor can detect when the tip of the writing instrument is pressed into a surface. Once the pressure sensor reads a certain pressure, the optical tracking system can be turned on. Alone or in conjunction with the pressure sensor, a tilt sensor within the writing instrument can also be used to provide power to the optical tracking system. Using output from the tilt sensor, the optical tracking system can be turned on only when the writing instrument is in a writing position. In another implementation, the optical tracking system can be turned on only when the writing instrument is in a writing position and the pressure sensor detects that the writing instrument is being used. To avoid repeatedly turning the optical tracking system on and off, a time period of inactivity can be used to turn off the optical tracking system. For example, if pressure or tilt indicates that the writing instrument is not being used for more than a predetermined amount of time, e.g., 1 s, 2 s, 3 s, 5 s, etc., the optical tracking system can be turned off. Other components of the writing instrument can also be turned off based upon these sensors. For example, a processor, a transmitter, etc., of the writing instrument can be turned off after a predetermined amount of time, which may or may not be the same as the predetermined amount of time used to turn off the optical tracking system. The writing instrument can also include a button that can turn the writing instrument on or off based upon user input.

Figure 3:
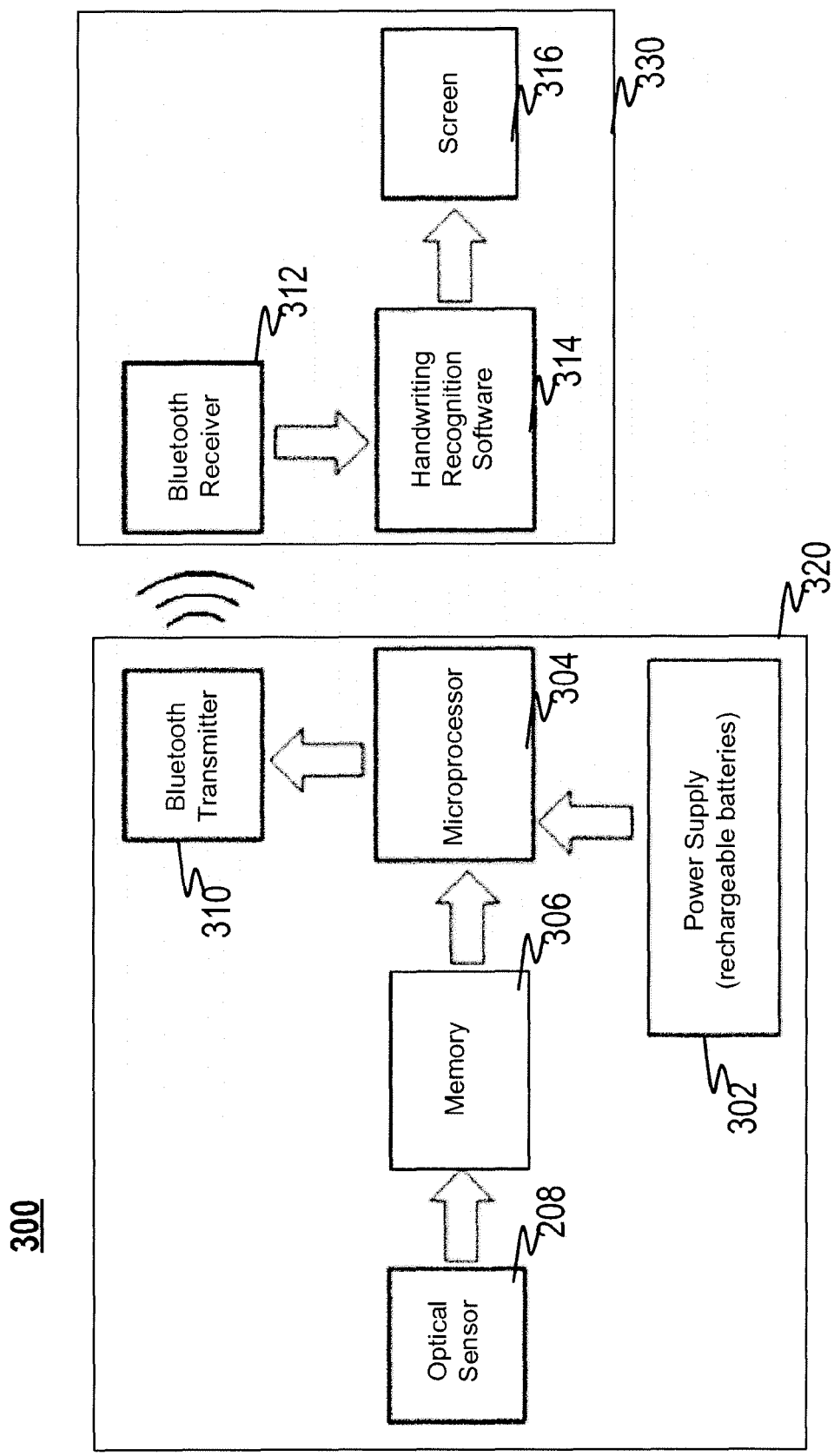
FIG. 3 is a block diagram of an optoelectronic digital writing instrument with a computer system and a portable digital device system in accordance with an illustrative implementation.

FIG. 3 is a block diagram of an optoelectronic digital writing instrument with a computer system and a portable digital device system in accordance with an illustrative implementation. A writing instrument 320 can include a power supply 302, a microprocessor 304, memory 306, an optical sensor 208, and a wireless transmitter 310. The power supply 302 can provide power to the microprocessor 304, the memory 306, the optical sensor 208, and the wireless transmitter 310. The power supply 302 can include removable and/or rechargeable batteries. As described with respect to FIG. 2, the optical sensor 208 can be used to detect and record the movement of the writing instrument 320. Movement data from the optical sensor 208 can be stored in the memory 306. The microprocessor 304 can control the transmission of the movement data to a portable digital device 330 using the transmitter 310.

Figure 4:
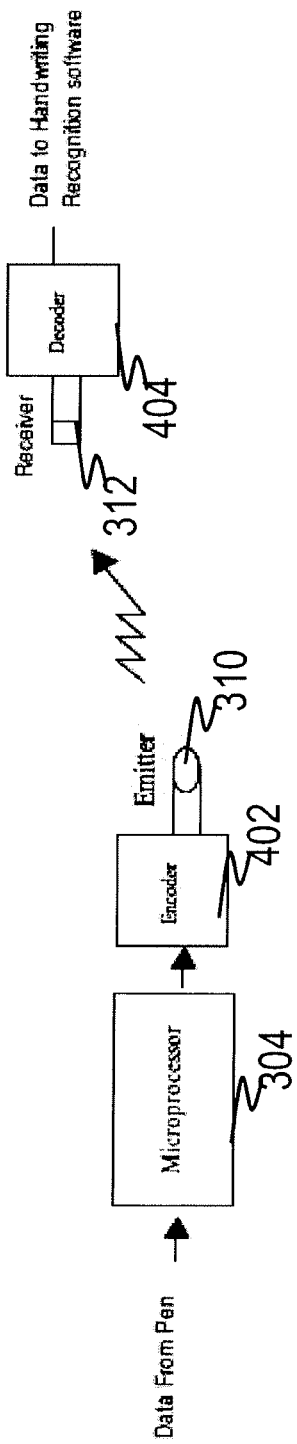
FIG. 4 is a block diagram of a transmitter of an optoelectronic digital writing instrument and a receiver of a portable digital device system in accordance with an illustrative implementation.

FIG. 4 is a block diagram of a transmitter of an optoelectronic digital writing instrument and a receiver of a portable digital device system in accordance with an illustrative implementation. An encoder 402 can encode the movement data prior to being transmitted. A corresponding decoder 404 can decode the received movement data. The decoded data can then be sent to a handwriting recognition module 314. Data can be encoded/decoded based upon the portable digital device. For example, the encoding/decoding algorithm can be system specific depending upon the portable digital device being used.

In one implementation, the recorded movement data can be sent to the portable digital device 330 using a built-in Bluetooth™ transmitter. The portable digital device 330 includes a receiver 312, e.g., a Bluetooth™ receiver, to receive the movement data from the writing instrument 320. The movement data can then be used by a handwriting recognition module 314 to recognize what the user wrote. In one implementation, the handwriting recognition module 314 can convert the movement data into ASCII format and store the ASCII data. In another implementation, a graphical format of the writing can be saved. The ASCII data and/or graphical format can be displayed on a screen 316 of the portable digital device 330.

In one implementation, the handwriting recognition module 314 is software that can interpret the intelligible handwritten input from the recorded movement of the writing instrument. The movement of the tip of the writing instrument is sensed "on line" with the optoelectronic tracking system that detects and records the movement of the writing instrument. In one implementation, the handwriting recognition module 314 principally entails optical character recognition.

Figure 5:
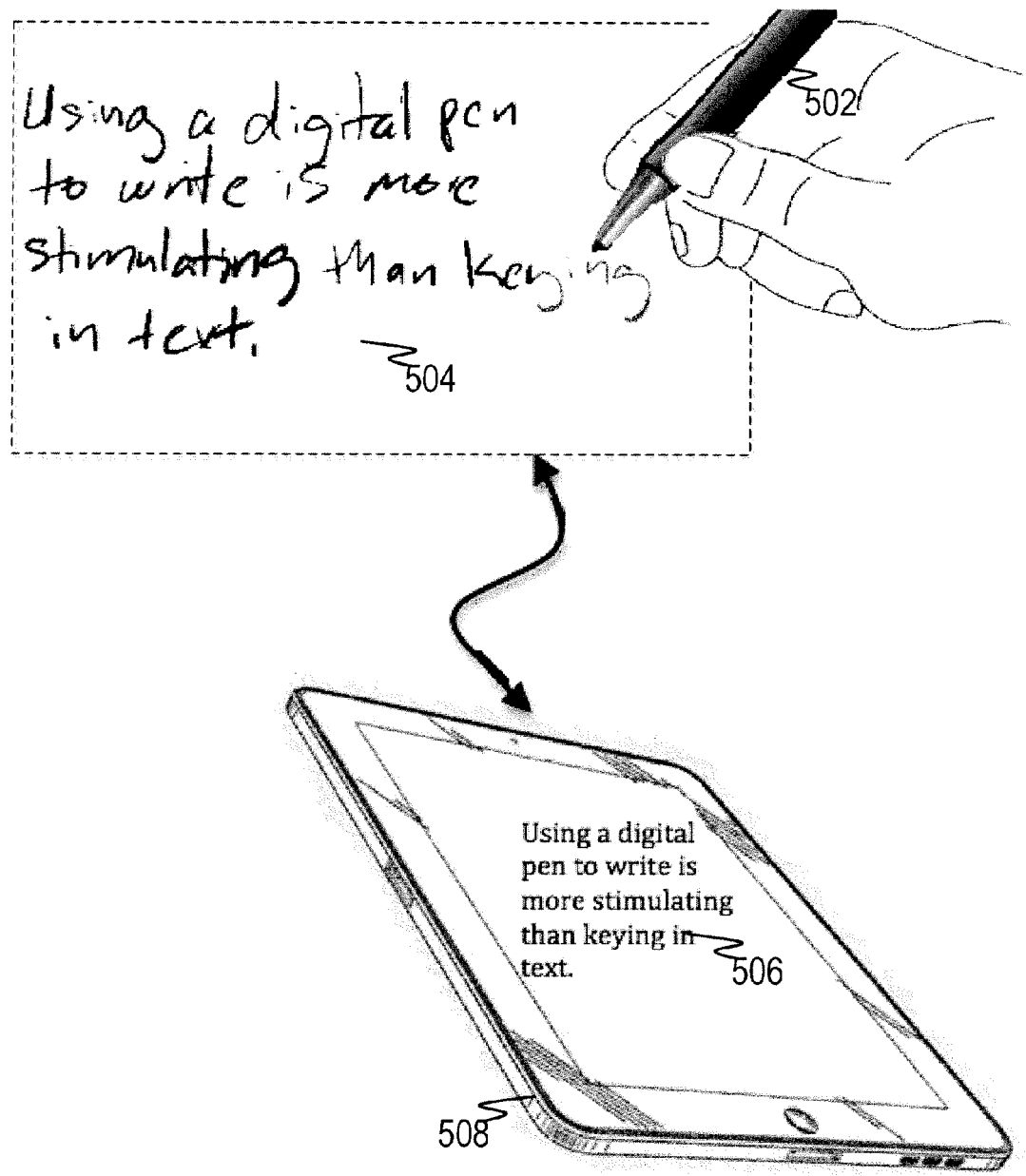
FIG. 5 illustrates an optoelectronic digital writing instrument connected to a digital device in accordance with an illustrative implementation.

FIG. 5 illustrates an optoelectronic digital writing instrument connected to a digital device in accordance with an illustrative implementation. A writing instrument 502 is used to write text 504 on a writing surface. The writing instrument 502 records its movements that correspond with the written text 504. This movement data can be sent to a portable digital device 508 and then displayed on a display 506. As illustrated in FIG. 5, the writing instrument 502 allows indirect interaction between the user and a portable digital device 508, such as a smart phone, e.g., the capturing and displaying of data on the smart phone without requiring direct user input into the smart phone.

In one implementation, a writing surface can be defined by its four corners. The writing surface can be any surface, e.g., a sheet of paper, an area on a desk, a notepad, etc. In this implementation, the display of the portable digital device will be scaled to the user defined writing surface. To link the user defined writing surface with the display, a calibration process is used. In one implementation, each of the four corners is selected. The writing instrument must be kept close enough to the surface of the writing surface so that the writing instrument can track the movement of the pen. Upon reaching a corner, the user can select a point as one of the corners of the writing surface. In one implementation, the user can select the point by pressing a button on the writing instrument. In another implementation, pressing down on the writing instrument causes the point to be selected as a corner. In another implementation, the user can define a rectangular area without specifically specifying the corners. For example, the user can trace the rectangle and the corners can be derived from the movement data.

In another implementation, a writing surface can be defined by selecting the calibration process to start. The calibration process can be started in various ways. For example, a button on the writing instrument or on the portable digital device can be used to start the calibration process. Once started, the user can draw the boundaries of the writing surface. Using the movement data, the writing instrument can determine when the user has moved the pen back to a location near the starting point. At that time, the writing surface has the dimensions as traced by the user. These dimensions can be sent to the portable digital device and the display can be scaled to correspond to the dimensions of the writing surface. In this implementation, the writing surface can be any shape, e.g., a circle, triangle, quadrangle, etc. Where the writing surface is not a rectangle or square, the writing area can be scaled such that the entire or a portion of the writing surface is displayed on the display screen of the portable digital device.

The calibration process can map the dimensions and shape of the writing surface to become proportional to the dimensions and shape of the area over which information is displayed on the screen of the smart phone. As the calibration software enables the user to preset the borders of the writing surface, the display of the portable digital device can be scaled to correspond to the writing surface. In some implementations, writing outside of the writing surface is not captured. For example, if the user goes outside the borders of the writing surface, the writing instrument will stop collecting movement data and nothing will be transmitted to the digital device. As a further example, when the writing surface is a rectangle and the corners are defined, the four values of (x,y) coordinates are saved into the memory of the writing instrument. The microprocessor checks the coordinates before transmitting to the digital device. If the value of the coordinates is outside the preset range, then the movement is not recorded.

Once the display is scaled to the dimensions of the writing surface, where the user writes within the writing surface can be used to place the recognized text on the display. One purpose of defining and calibrating the boundaries of the area of the writing surface is to establish the initial reference points. In one implementation, the starting and the ending points of the writing area in the calibration process are one and the same. This allows the system to calculate the equivalent rectangular area of the writing surface. The starting point enables the system to optically track the relative movement of the pen. The starting point and the equivalent rectangular area in combination allows the positioning of the written material at the right location within the defined area. As it is not uncommon for a user, using a pen and paper, to write and/or draw at various locations on the paper, at any time, the writing will appear in a relative position on the display. This allows the digital display to capture a true "snap shot" of what and how the user has written or drawn the information on the writing surface and maintain its integrity. Both the textual and spatial information can be captured and displayed on the digital screen. As an example, the user can write a first amount of text near the top of the writing surface and then a second amount of text near the bottom of the writing surface. The coordinates within the writing surface can be determined based upon the movement data. Either the writing instrument or the portable digital device can determine the coordinates of text within the writing surface based upon the movement data. In either case, the portable digital device can place the recognized text in its appropriate position, such that the text displayed on the portable digital device is similarly placed compared to the written text on the writing surface.

To properly track the movement of the writing instrument around the writing surface, the writing instrument needs to stay close enough to the writing surface such that the optical sensor system can record movement of the writing instrument. At times where the user wants to move to a new position of the writing surface without actually writing, the user can press a button on the writing instrument. This button indicates that the writing instrument is moving but not writing. Accordingly, this movement data is not used by the portable digital device to determine what the user has written. Rather, the movement data is used to determine the location of the writing instrument within the writing surface. In one implementation, at any time during the writing process, if the optical tracking communication is broken for any reason, this can be indicated on the display screen of the portable digital device. In order to continue writing on the writing surface, which can be displayed and recorded simultaneously by the portable digital device, the user can again to touch the starting point of calibration with the pen. This would enable the system to, once again, start tracking the relative movement of the pen using the optical tracking mechanism. The user, however, does not have to complete the entire calibration process, namely, defining the boundaries of the writing surface.

As the user writes on the writing surface, the user can move to a new page by selecting a button on the writing instrument. For example, once the user has written a full page of text, the user can select to start on a new page by pressing a button on the writing instrument. In one implementation, gestures can be used to create a new page or move to a previous page. For example, selecting a button and then moving the writing instrument to the left or right can advance to the previous or next page, respectively.

The described writing instrument can be used in various different ways. One example is a system where the user can write on a white board in a classroom or a conference room and the information/data is directly transmitted to his digital device (laptop, smart phone, tablet or a remote server). Various other exemplary uses of the described writing instrument include:

- a user in a social setting, alone or with a group of people, where the use of a digital device could be considered inappropriate/awkward. In such a situation the user could easily take notes/create information on a piece of available paper, which would simultaneously be transmitted to his portable digital device;
- journalists in a press conference can take notes on a pad/paper where the written data would simultaneously be transmitted to their portable digital devices;
- student users in a classroom where it is easier to take lecture notes on a pad/paper and have the data simultaneously transmitted to their portable digital devices; or
- waiters in restaurants taking down customer orders on a pad/paper and having data simultaneously transmitted to the digital device (remote server) in the kitchen.

Figure 6:
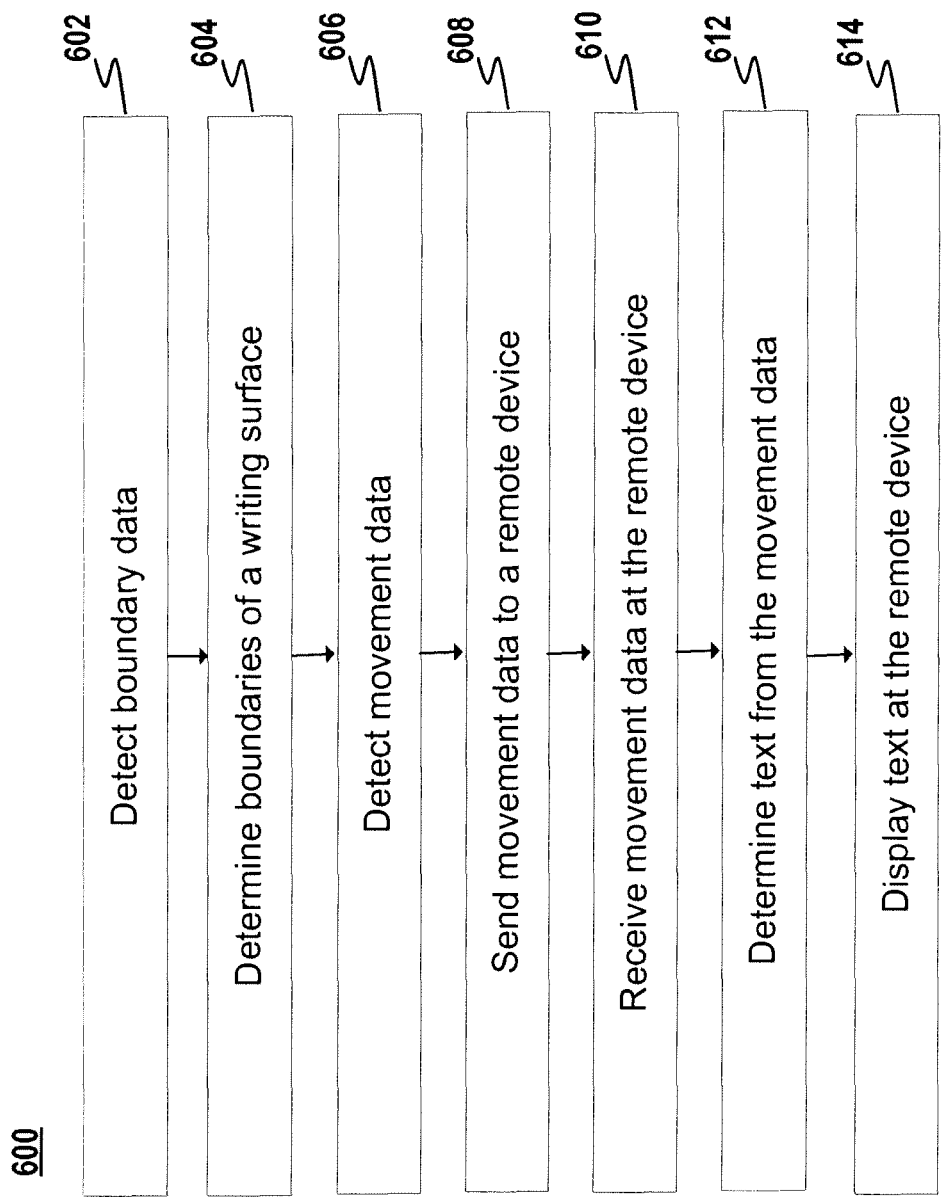
FIG. 6 illustrates a flow diagram of a process for displaying text at a remote device that corresponds with movement data of a writing instrument in accordance with an illustrative implementation.

FIG. 6 illustrates a flow diagram of a process for displaying text at a remote device that corresponds with movement data of a writing instrument in accordance with an illustrative implementation. The process 600 can be implemented on a computing device. In one implementation, the process 600 is encoded on a computer-readable medium that contains instructions that, when executed by a computing device, cause the computing device to perform operations of process 600.

The process 600 includes detecting boundary data (602). For example, as describe above, boundary data can be collected by selecting four points or tracing the boundary of a writing surface. The boundary data is used to define the boundaries of a writing surface (604). Once the boundaries of the writing surface have been determined, additional movement data is detected (606). For example, movement data can be generated as the user writes using the writing instrument within the writing surface. The movement data is sent to a remote device (608). The remote device can be a portable digital device or remote server used to store the movement data. The movement data can be sent wirelessly in real-time to the remove device, e.g., using Bluetooth. The remote device receives the movement data (610). Based upon the movement data, the remote device determines text associated with the movement data (612). For example, the remote device can use a handwriting recognition module to determine text based upon the movement data. The recognized text can then be displayed on the remote device (614). In one implementation, the display of the remote device is scaled to the dimensions of the writing surface. In this implementation, the text is displayed in an area on the display based upon where the text was written in the writing surface.

Figure 7:
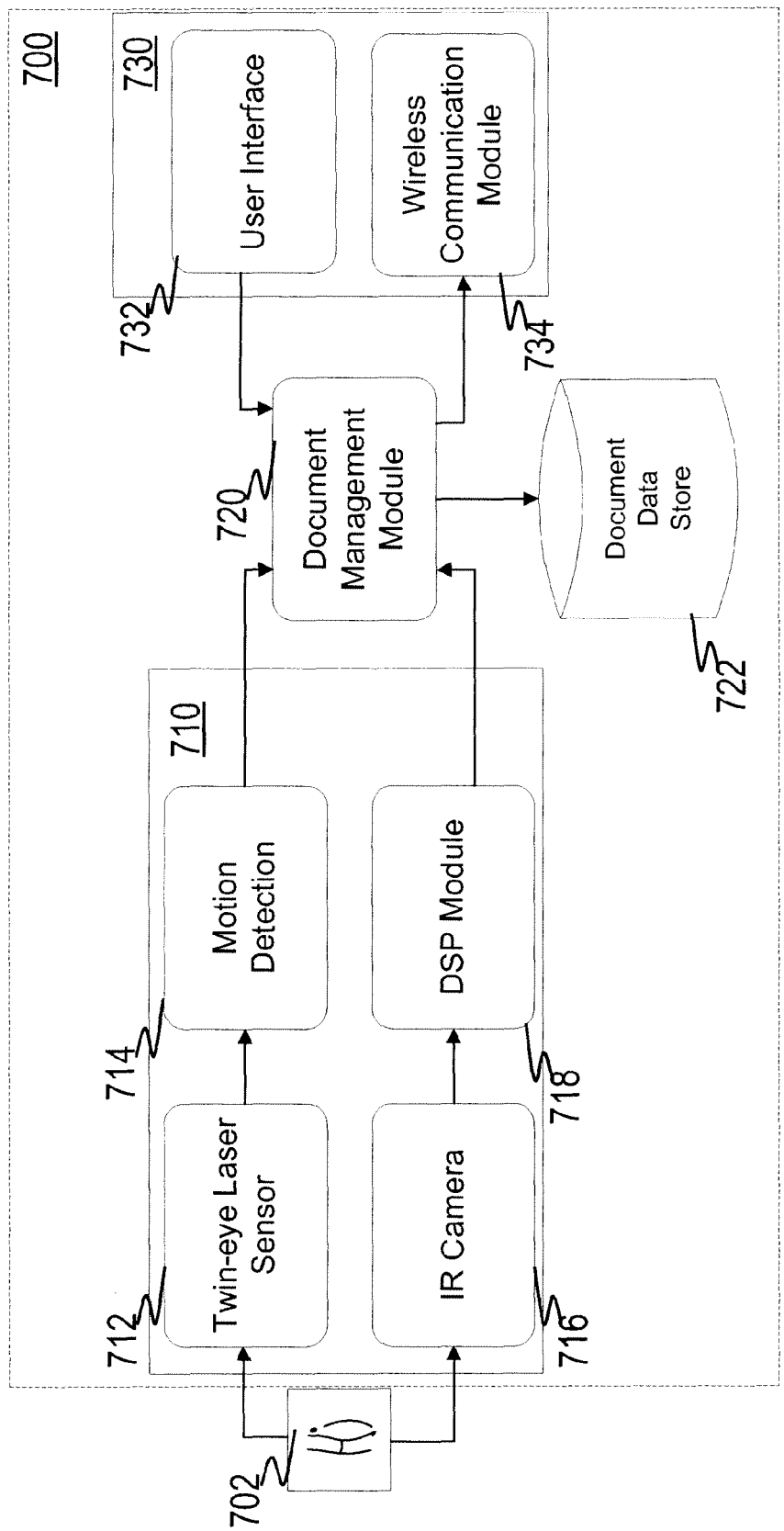
FIG. 7 is a block diagram of an optoelectronic digital writing instrument that includes a twin-eye laser sensor in accordance with an illustrative implementation.

As described above in reference to FIG. 1B, various implementations of the optoelectronic digital writing instrument can have a twin-eye laser that is used to detect movement of the writing instrument. FIG. 7 is a block diagram of an optoelectronic digital writing instrument 700 that includes a twin-eye laser sensor 712 in accordance with an illustrative implementation. The writing instrument 700 includes data acquisition components 710 and interface components 730. In addition, the writing instrument 700 can include a document management module 720 and a document data store 722. The data acquisition portion of the writing instrument 700 can include a twin-eye laser sensor 712 and a motion detection module 714. The twin-eye laser sensor 712 transmits light and receives reflected light to detect velocity and position of the writing instrument 700. In one implementation, the twin-eye laser sensor 712 includes two 850 nanometer solid-state lasers. In addition, a lens of the sensor 712 can be used to focus the lasers onto a surface. The light can reflect or scatter from the surface, some of which re-enters the twin-eye laser sensor 712. The reflected light at the sensor 712 can mix with light that is generated by the sensor 712. As is known in the art, the speed and the direction at which the writing instrument 700 is moving can be determined based upon the generated and returned light.

The twin-eye laser sensor 712 can output signal information to a motion detection module 714. The motion detection module 714 can compute the position and velocity of the writing instrument 700. For example, the motion detection module 714 can determine the position and velocity of the writing tip of the writing instrument 700. The position and velocity information can be forwarded to the document management module 720. The document management module 720 can perform handwriting recognition on the received information using known algorithms. For example, recurrent neural networks can be used to convert writings into text. Recurrent neural networks are useful for sequence labeling tasks where the received data is hard to segment and contains long-range bidirectional interdependencies. As part of the handwriting recognition, the received information can be used to determine the stroke sequence of the user's handwriting. In addition, contextual and spatial classes of features can be determined from the received information. These features can be used as inputs to the handwriting recognition algorithm. The contextual class of features can be extracted for each point in the user's handwriting by considering its neighbors in a time series. Features of the spatial class are based on the spatial information of a point. Using the various features and/or the stroke sequence the user's handwritings can be converted to text. The text can then be incorporated into one or more documents that are managed by the document management module 720. In another implementation, the handwriting recognition can be done by a remote computing device. In this implementation, the tracking data can be sent to a remote computing device that implements the handwriting recognition algorithm. The recognized handwriting can either be sent back to the writing instrument 700 for storage in the document data store 722 or saved in a data store separate from the writing instrument 700.

Documents handled by the document management module 720 can be multiple pages. A user can specify a new page via a user interface 732 of the writing instrument 700. For example, a dedicated button or a soft button can be pressed to indicate the start of a new page. Additional buttons can allow a user to go forward or backward through a document, clear a page, start a new document, select text, cut/copy/paste text, underline text, bold text, italicize text, etc. For example, the document management module 720 can allow users to format text based upon input received from the user interface 732. When the writing instrument 700 is coupled to a display device (not shown) the user can format selected text by activating a particular button on the writing instrument 700 or by activating a button displayed on the display device. Regardless of how the user inputs the requested formatting, the document management module 720 receives the format request and formats the selected text accordingly. In another implementation, the document management module 720 can prompt the user for formatting when a word, sentence, paragraph, etc., is input by the user.

The document management store 720 can also send documents and/or tracking data to a wireless communication module 734 for transmission to a remote computing device. Wireless communication can occur via any known wireless protocol. Documents can also be sent to a document data store 722. The document data store 722 can be a local memory chip embedded in the writing instrument 700 or can be a removable memory store, such as a memory stick. The document data store 722 can also store some or all of the information received at the document management module 720.

Figure 8:
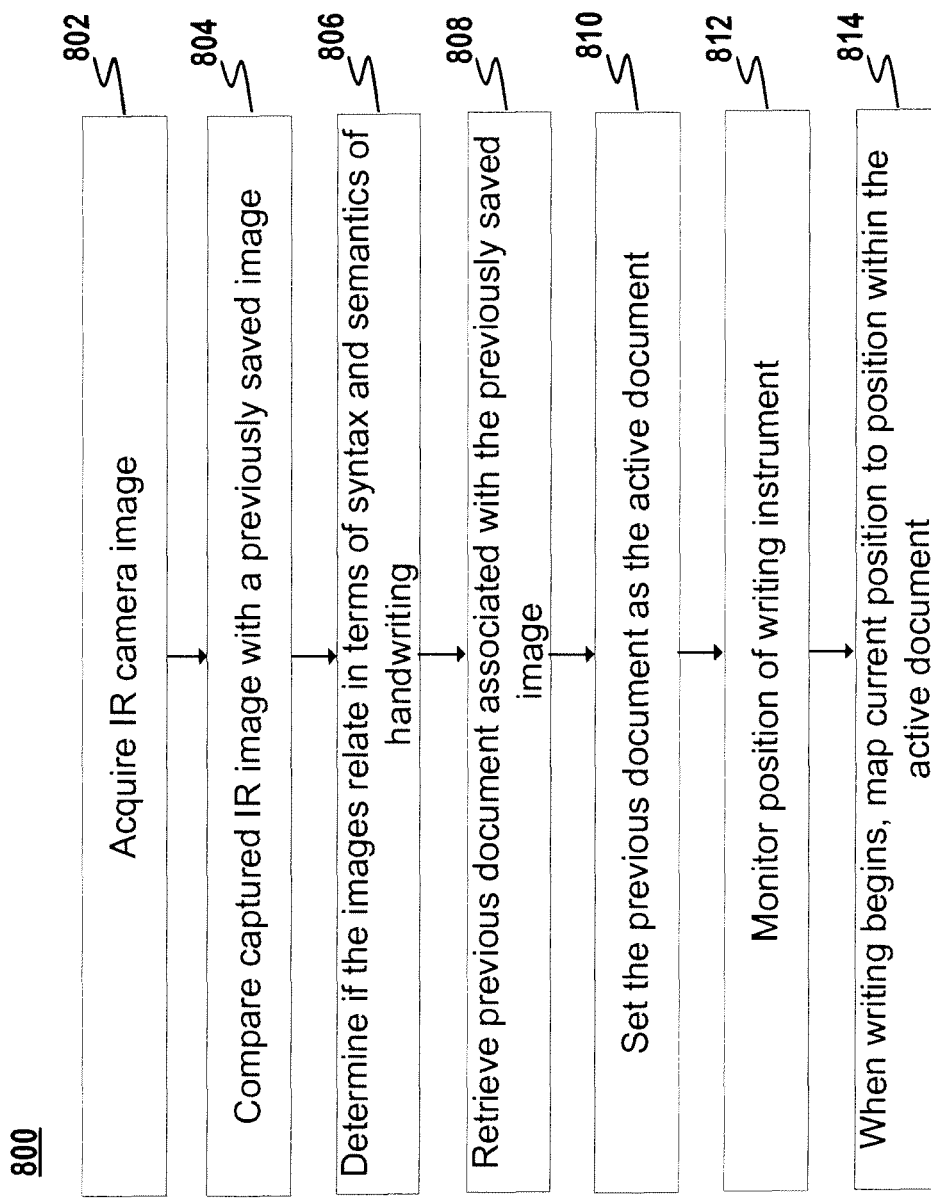
FIG. 8 illustrates a flow diagram of a process for calibrating previous writings in accordance with an illustrative implementation.

As mentioned above, the writing instrument 700 can be calibrated with previously writings. An infra-red camera 716 can take a picture of a writing surface 702 that includes previously written text, figures, drawings, etc. A DSP module 718 can receive the captured image and determine if the captured image matches any previously stored documents. If a match is found, the user can begin addition new writings to the document at the point where the user stopped writing. FIG. 8 illustrates a flow diagram of a process for calibrating previous writings in accordance with an illustrative implementation. The process 800 can be implemented on a computing device. In one implementation, the process 800 is encoded on a computer-readable medium that contains instructions that, when executed by a computing device, cause the computing device to perform operations of process 800.

The process 800 includes acquiring an image of a general surface using a camera (802). The camera can be the infra-red camera 716. In one implementation, the image can be captured by activating a calibration button 162. The captured image is compared to one or more previously saved writings (804). For example, previously saved images of general surfaces can be compared to the captured image. Using the syntax and semantics of handwriting in both the captured image and the saved writings, it is determined if any image relates to the captured image (806). For example, the DSP module 718 can determine if the handwriting in the captured image matches the handwriting in any saved image and/or writings. In one implementation, a Binary Robust Independent Elementary Features (BRIEF) algorithm can be used to identify relationships between the captured image and saved images. The BRIEF algorithm uses feature point descriptions and a collection of decision trees to classify images. Such an algorithm is not affected by rotation, scale, and lighting of the images. When a match is found, the previously saved document associated with the matched image is retrieved (808). For example, the previously saved document can be retrieved by the document management module 720 from the document data store 722. The previously saved document is set as the current working document (810). In one implementation, a user can place the writing instrument at the top left of the existing handwriting and drag the writing instrument to any position to begin writing. The movement of the writing instrument can be monitored as the user moves the writing instrument to the writing position (812). In one implementation, the twin-eye laser can measure the motion of the writing instrument to find the current position of the writing instrument. The beginning of the handwriting can act as a reference for the appended handwriting. In one implementation, when writing begins the writing instrument's current position is mapped to a position within the active document (814). For example, the current position can be mapped to the end of the active document. This allows for the writings to be appended to the previously saved document, which allows the user to continue to add writings to an earlier saved document. For example, this allows a user write an incomplete sentence, paragraph, document, etc. and later return and complete the work from where the user left off. In another implementation, when writing begins, the current position of the writing instrument is mapped to the center of the captured image.

In other implementations, an optoelectronic digital writing instrument can be used to provide input to remote devices. For example, the writing instrument can provide text input to remote devices. Recognized handwriting can be transmitted to remote devices via wireless communication. Thus, the writing instrument can be used in place of virtual keyboards of smart phones to provide input to the smart phone. In another implementation, the writing instrument can be used to control remote devices, such as home appliances, doors, windows, thermostats, lighting, etc. For example, users can write commands, e.g., "command: turn light on," using the writing instrument. This command can be sent to a remote device which turns on a light based upon receiving the command. The command can be sent upon recognition of the command or after the user activates a button to send the command. In yet another implementation, the writing instrument can act as a game controller. In this implementation, movement of gaming elements can be controlled based upon movement of the writing instrument. For example, the movement of the pen can be used to control the speed and direction of a car or to control the movement of a gaming character. In addition, commands can be written, recognized, and sent to a gaming console. For example, a user can signal to quit a game, restart a game, pause a game, etc., using commands. In another implementations, gestures can be used to indicate a command. For example, rather than writing "pause" the user can pause a game by drawing a relatively large "p." Gestures can be used as short cuts for commands in any implementation of the writing instrument.

In another implementation, writings can be transmitted to one or more remote devices. For example, writings from one writing instrument can be transmitted to other writing instruments or computing devices. As one example, a teacher could write class notes using a writing instrument. The class notes could then be sent to each student's smart phone or the student's writing instrument. Having the class notes saved to another writing instrument, allows the class notes to be selected as the current document and edited by the student. For example, a student could add their own notes to the received class notes document. In yet another implementation, two writing instruments could be used to edit a single document simultaneously. Tracking data and/or recognized writings from each writing instrument is transmitted to the other writing device. These transmissions allow each writing instrument to have a copy of the document, while allowing each user to edit the document concurrently.

In another implementation, the writing instrument can include a mini-projector device that projects the contents of the current document onto a surface. This allows the writing instrument to provide feedback to the user regarding the recognized handwriting. The projected image can be on the same or different general surface used by the user to write. In one implementation, the projected image is on the same general surface currently being written on by the user, but is offset such that the projected image is spatially separate from the writing area. In one implementation, the projector allows two or more people to communicate via writing instruments. For example, two people can have their writing instruments send tracking data and/or recognized handwriting to one another. The writing instrument can project the data of both users, thus allowing two people to communicate. In addition, this allows two or more users to edit the same document concurrently.

FIG. 9 is a block diagram of a computer system in accordance with an illustrative implementation. The computer system or computing device 900 can be used to implement portions of the writing instrument and/or the portable digital device in accordance with one or more implementations of the present invention. The computing system 900 includes a bus 905 or other communication component for communicating information and a processor 910 or processing circuit coupled to the bus 905 for processing information. The computing system 900 can also include one or more processors 910 or processing circuits coupled to the bus for processing information. The computing system 900 also includes main memory 915, such as a random access memory (RAM) or other dynamic storage device, coupled to the bus 905 for storing information, and instructions to be executed by the processor 910. Main memory 915 can also be used for storing position information, temporary variables, or other intermediate information during execution of instructions by the processor 910. The computing system 900 may further include a read-only memory (ROM) 910 or other static storage device coupled to the bus 905 for storing static information and instructions for the processor 910. A storage device 925, such as a solid state device, magnetic disk or optical disk, is coupled to the bus 905 for persistently storing information and instructions.

The computing system 900 may be coupled via the bus 905 to a display 935, such as a liquid crystal display, or active matrix display, for displaying information to a user. An input device 930, such as a keyboard including alphanumeric and other keys, may be coupled to the bus 905 for communicating information and command selections to the processor 910. In another implementation, the input device 930 has a touch screen display 935. The input device 930 can include a cursor control, such as a mouse, a trackball, or cursor direction keys, for communicating direction information and command selections to the processor 910 and for controlling cursor movement on the display 935.

According to various implementations, the processes described herein can be implemented by the computing system 900 in response to the processor 910 executing an arrangement of instructions contained in main memory 915. Such instructions can be read into main memory 915 from another computer-readable medium, such as the storage device 925. Execution of the arrangement of instructions contained in main memory 915 causes the computing system 900 to perform the illustrative processes described herein. One or more processors in a multi-processing arrangement may also be employed to execute the instructions contained in main memory 915. In alternative implementations, hard-wired circuitry may be used in place of or in combination with software instructions to effect illustrative implementations. Thus, implementations are not limited to any specific combination of hardware circuitry and software.

Although an example computing system has been described in FIG. 9, implementations described in this specification can be implemented in other types of digital electronic circuitry, or in computer software, firmware, or hardware, including the structures disclosed in this specification and their structural equivalents, or in combinations of one or more of them.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
    a document data store configured to store an image comprising first two or more handwritten words captured in the image;
    a writing instrument comprising:
        an optical tracking system configured to detect movement and record movement data of the writing instrument;
        a camera configured to capture an image of an entirety of a general surface, wherein the general surface has second two or more handwritten words written on the general surface and captured in the image of the general surface, wherein a boundary of the entirety of the general surface is established by two or more reference points;
        a digital signal processing (DSP) module configured to compare the captured image to the image to determine if it is a related image, wherein the determination is based upon syntax of the first two or more handwritten words recognized in the captured image and the second two or more handwritten words; and
    a processor configured to:
        determine a digital text document associated with the related image, wherein the digital text document comprises the text equivalent of the second two or more handwritten words;
        map a position of the writing instrument to a position within the digital text document;
        convert the movement data into text; and
        append the text to the digital text document based upon the mapped position within the digital text document.

2. The system of claim 1, wherein the writing instrument comprises the processor and the document data store and the system further comprises an infra-red sensor configured to detect a distance from the general surface, wherein the optical tracking system is further configured to only detect movement and record movement data of the writing instrument when the distance from the general surface is below a predetermined threshold.

3. The system of claim 1, wherein the processor is remote from the writing instrument and the writing instrument further comprises a transceiver configured to communicate the processing elements on the writing instrument and the remote device.

4. The system of claim 1, the writing instrument further comprising a projector configured to project the text onto a second general surface.

5. The system of claim 4, wherein the writing instrument further comprises a receiver configured to receive recognized text from a second, different writing instrument, wherein the projector is further configured to project the recognized text from the second writing instrument onto the second general surface in synchronisation with the existing handwritings.

6. The system of claim 1, further comprising a transmitter configured to transmit the text to a plurality of remote devices.

7. The system of claim 1, wherein the optical tracking system comprises a twin-eye laser, lens, and sensing module.

8. The system of claim 1, wherein the text comprises a command that is sent to a remote device, wherein the remote device changes state based upon the received command.

9. The system of claim 1, wherein the determination based upon syntax of the first two or more handwritten words recognized in the captured image and the second two or more handwritten words is based on using a Binary Robust Independent Elementary Features (BRIEF) algorithm to identify relationships between the captured image and the image.

10. A method comprising:
    capturing, using a camera, an image of an entirety of a general writing surface containing first two or more handwritten words captured in the image, wherein a boundary of the entirety of the general surface is established by two or more reference points;
    comparing the captured image with a previously saved image, wherein the previously saved image comprises a second two or more handwritten words captured in the previously saved image;
    determining the previously saved image is a related image based upon a syntax of the first two or more handwritten words recognized in the captured image and the second two or more handwritten words of the previously saved image;
    retrieving a previously stored digital text document associated with the related image;
    setting the previously stored digital text document as an active document; and
    mapping a position of a writing instrument to a position within the active document.

11. The method of claim 10, further comprising:
    receiving movement data based upon detected movement of the writing instrument;
    recognizing text from the movement data; and
    appending the text to the active document based on the mapped position within the active document.

12. The method of claim 10, wherein determining the related image based upon the syntax of the first two or more handwritten words is based on using a BRIEF algorithm to identify relationships between the captured image and the one or more previously saved images.

13. A non-transitory computer-readable medium, having instructions stored thereon, the instructions comprising:
    instructions to capture an image of a general writing surface containing a first two or more handwritten words, wherein the first two or more handwritten words are captured in the image;
    instructions to compare the captured image with a previously saved image, wherein the previously saved image comprises a second two or more handwritten words captured in the previously saved image;

instructions to determine whether the previously saved image is a related image based upon syntax of the first two or more handwritten words recognized in the captured image from the and the second two or more handwritten words;

instructions to retrieve a previously stored digital text document associated with the related image, wherein the previously stored digital text document comprises the text equivalent of the respective two or more handwritten words captured in the related image;

instructions to set the previously stored digital text document as an active document; and instructions to map a position of a writing instrument to a position within the active document.

14. The non-transitory computer-readable medium of claim 13, wherein the instructions further comprise:

instructions to receive movement data based upon detected movement of the writing instrument when a pressure sensor detects a tip of the writing instrument is in contact with the general writing surface;

instructions to recognize text from the movement data; and instructions to append the text to the active document based on the mapped position within the active document.

15. The non-transitory computer-readable medium of claim 14, wherein the instructions further comprise instructions to transmit the movement data to the processor.

16. The non-transitory computer-readable medium of claim 14, further comprising instructions to project, using a projector, the text onto a second general surface.

17. The non-transitory computer-readable medium of claim 16, wherein the instructions further comprise:

instructions to receive recognized text from a second, different writing instrument; and instructions to project the recognized text from the second writing instrument onto the second general surface.

18. The non-transitory computer-readable medium of claim 14, wherein the instructions further comprise:

instructions to provide formatting instructions regarding the text; and instructions to format the text based upon the formatting instructions.

19. The non-transitory computer-readable medium of claim 14, wherein the instructions further comprise instructions to send a command based upon the text to a remote device, wherein the remote device changes state based upon the received command.

20. The non-transitory computer-readable medium of claim 13, wherein the instructions to determine whether the previously saved image is the related image based upon syntax of the first two or more handwritten words is based on using a BRIEF algorithm to identify relationship.

* * * * *